UNITED STATES PATENT OFFICE.

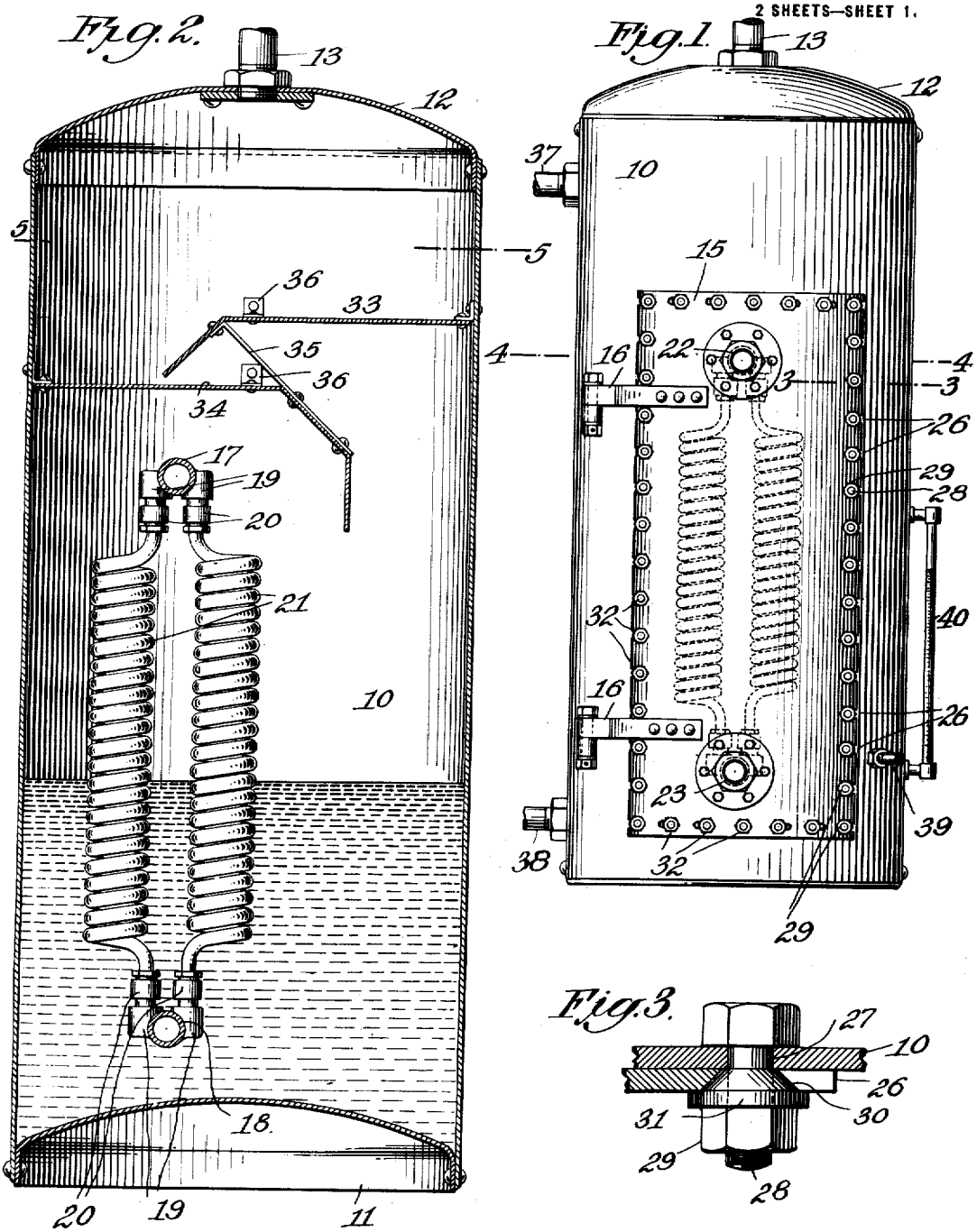

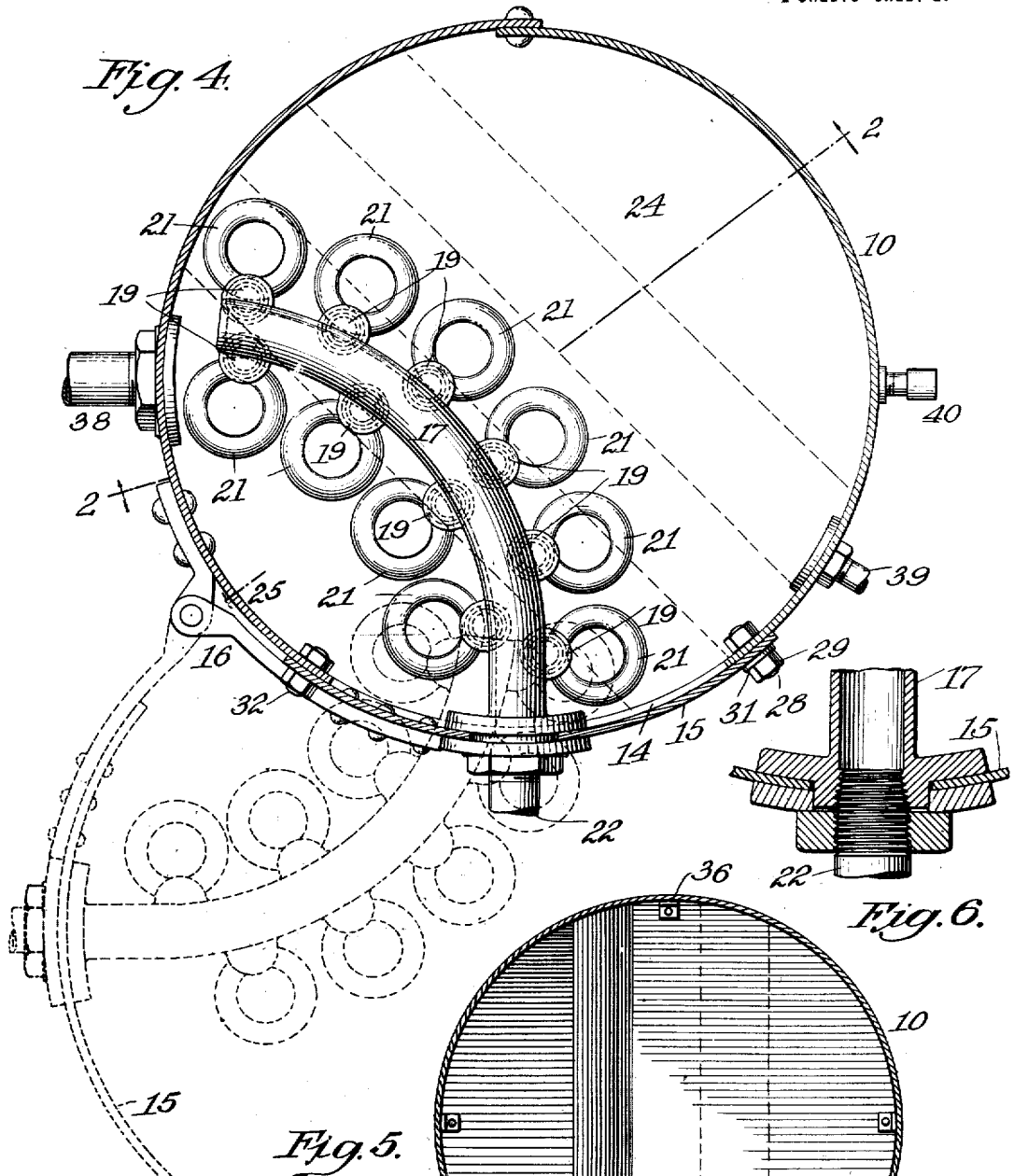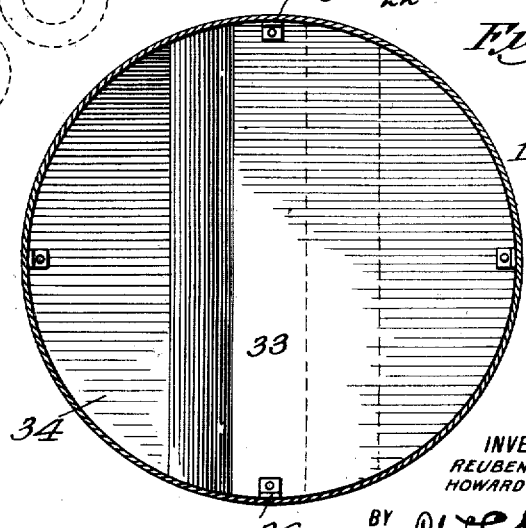

REUBEN R. ROW AND HOWARD C. DAVIS, OF ELIZABETH, NEW JERSEY, ASSIGNORS TO AMERICAN MARINE EQUIPMENT CORPORATION, OF NEW YORK, N. Y., A CORPORATION OF DELAWARE.

EVAPORATOR, FEED-WATER HEATER, AND THE LIKE.

1,304,379.    Specification of Letters Patent.    Patented May 20, 1919.

Application filed March 14, 1917. Serial No. 154,672.

*To all whom it may concern:*

Be it known that we, REUBEN R. Row and HOWARD C. DAVIS, citizens of the United States, and residents of Elizabeth, in the county of Union and State of New Jersey, have invented certain new and useful Improvements in Evaporators, Feed-Water Heaters, and the like, of which the following is a specification.

The invention pertains more particularly to evaporators for providing pure distilled water for boiler-feeding, drinking and other purposes, and one object of the invention is to provide an evaporator which shall be highly efficient in use and capable of being conveniently constructed, handled and manipulated. One of the purposes of the invention is to so construct the evaporator with respect to the coils and their location as to create a circulation of the water to be evaporated of special character tending to the efficiency of the apparatus as a whole. A further purpose of the invention is to make it convenient to expose the heating coils and their manifolds for any attention such coils and manifolds may require, and to this end we provide the shell or casing of the apparatus with a door hinged at one vertical edge and carrying arcuate manifolds with the helical coils connecting said manifolds, so that when the door is opened on its hinges, the manifolds and coils are withdrawn outwardly to exposed position through a doorway of reasonably narrow width. When the door is moved to closed position, the manifolds and the coils carried thereby are moved inwardly to one lateral side of the chamber within the shell, creating a commodious compartment for the body of the water within the shell and a smaller compartment within which the more violent ebullition of the water takes place.

The invention will be fully understood from the detailed description hereinafter presented, reference being had to the accompanying drawings, in which:

Figure 1 is a side elevation of an evaporator constructed in accordance with and embodying the invention;

Fig. 2 is an enlarged vertical section through the same, taken about on the dotted line 2—2 of Fig. 4.

Fig. 3 is a detail view, partly in top elevation, illustrative of the means for securing the free edge of the door in closed position, Fig. 3 being a partial sectional view, taken on the dotted line 3—3 of Fig. 1;

Fig. 4 is a horizontal section, on a larger scale, through the apparatus, taken on the dotted line 4—4 of Fig. 1, the door and manifolds and coils carried by the door being shown in operative position by solid lines and in an outwardly turned or exposed position by dotted lines; the diagonal dotted lines in Fig. 4 indicate the relation of the baffles with respect to the coils;

Fig. 5 is a horizontal section through the upper portion of the apparatus taken on the dotted line 5—5 of Fig. 2, and Fig. 6 is a detail view, in horizontal section, showing one way of securing the manifolds to the door.

In the drawings, 10 designates a vertical metallic cylinder or shell having a bottom 11 and a convex or dome head 12 equipped with an outlet pipe 13 for the vapor. The shell 10 has a vertical doorway or opening 14 in its side, and is equipped with a door 15 for closing said doorway. The door 15 is secured by hinges 16 to the shell, one member of each hinge being securely riveted to the shell and the other member of each hinge to the door, as will be understood on reference to Figs. 1 and 4. The door 15 is of segmental outline so that when in closed position it may constitute a continuation of the general walls of the shell or cylinder. Upon the upper and lower inner portions of the door 15 are secured manifolds or headers 17, 18, respectively, which correspond with each other and are segmental or of arcuate form in length and extend, when the door 15 is in closed position, from about the vertical center of the door laterally on curved lines toward one side of the cylinder 10. The manifolds 17, 18 have lateral extension 19 which are hollow and receive any suitable coupling members 20 which connect the vertical helical coils 21 with said manifolds. The coils 21 are disposed at opposite sides of the vertical plane of the manifolds 17, 18, as shown in Fig. 4, and said coils define segmental outlines corresponding with those of the manifolds. The coils 21 correspond with one another and are interchangeable, and in the construction presented by us a comparatively large number of the coils may be conveniently used,—ten of the coils being shown and each being capable of efficient service. The manifold or header 17 is in connection at the outer side of the door 15 with an inlet pipe 22, and the manifold or header 18 is at the outer side of the door in communication with an outlet or discharge pipe or condensation drain 23.

In our construction as hereinbefore described, we provide a hinged door so carrying the manifolds and coils that upon the opening of the door the manifolds and coils become withdrawn and exposed for any attention they may require, and that when the door is in closed position, the manifolds and coils are so disposed that we secure a very commodious chamber 24 at one side of the body or bank of coils and a chamber much less in size at the other side of the body or bank of coils, as at 25 (Fig. 4). The differential chambers 24, 25 are important in the operation of the apparatus and we secure these chambers by the arcuate outline defined by the manifolds and coils, and at the same time such outline of the manifolds and coils permits of the employment of the vertical hinged door 15 as a means for carrying the coils and exposing them when the door is opened. The arcuate outline of the bank of coils also permits of the employment of a door and door-way reasonably narrow in width.

The free edge of the door 15 must, when the door is in closed position, be securely held against the adjacent surfaces of the cylinder 10, and to accomplish this purpose we provide the edge of the door with a series of slots 26 which register with a series of holes 27 formed in the shell or cylinder 10, and at these slots and holes we provide headed studs 28, and nuts 29 having cone inner ends 30 and flanges 31, the heads of the studs 28 being within the cylinder 10 and the stem of said studs extending outwardly through the holes 27 and slots 26 and receiving the nuts 30. The inner end portions of the walls of the slots 26 are tapered inwardly, as shown in Fig. 3, to take the cone portion of the nuts 29. The manner of securing the free edge of the door 15 will be readily understood on reference to Figs. 1 and 3, it being apparent that after the door has been closed with the studs 28 extending through the slots 26, the nuts 29 are applied upon said studs and screwed up tightly against the door, drawing the heads of the studs against the inner surface of the shell and binding the cone surfaces 30 and flanges 31 against the adjacent surfaces of the door 15. The cones 30 and flanges 31 may be in separate pieces from the nuts 29, if preferred,— then constituting washers. The slots 26 permit of the convenient opening of the door 15, upon the removal of the nuts 29 without disturbing the studs 28, and said slots also admit of any necessary expansion of the door or shell when the apparatus is in use and subjected to internal heat and pressure. The upper and lower edges and hinged edge of the door are secured in closed position by studs and nuts 32 corresponding exactly with the structure illustrated in Fig. 3, said studs 32 extending through slots in the door corresponding with the slots 26 more fully illustrated in Fig. 3.

Above the chambers 24, 25 are baffle plates 33, 34 whose outer portions are secured to the walls of the cylindrical shell 10 and whose inner portions overlap and are deflected downwardly, as shown in Fig. 2, and are connected together by a brace 35. The inner portions of the baffles 33, 34 are also by means of angles 36 secured to the walls of the shell 10. The baffles 33, 34 are initially in the form of partial disks of sheet metal adapted to the inner circumference of the shell 10, as shown in Fig. 5, and the straight edge portion of said plates are bent downwardly so as to efficiently prevent entrained water from passing off with the vapor ascending to the outlet 13 therefor. We do not limit our invention to the special baffles 33, 34, shown in the drawing, since various constructions of baffles have been employed in evaporators and we propose that any suitable or desirable baffles may be made use of in our evaporator.

The shell 10 will be equipped with the usual or any suitable pipe and other connections, such as the vapor outlet 13, connection 37 for a safety valve, connection 38 for a blow-off valve, pipe 39 serving to feed water to the shell 10 and water gage 40.

In the employment of the apparatus as an evaporator the water is fed within the shell 10 and submerges the lower portions of the coils 21, and steam is admitted to the manifold 17, whence it passes downwardly through all of the coils 21, and the drain is through the manifold or header 18.

The action of the heated coils 21 on the water is commonly understood, vaporizing the water, with the vapor passing off through the pipe 13 to a condenser, or elsewhere as may be desired, but in the use of our invention highly efficient results are attained in that we provide the commodious chamber 24 at one side of the bank of coils and the narrower chamber 25 at the other side of said bank of coils, whereby without disturbing to an undue extent the entire body of water within the shell 10, the water passes from the chamber 24 to the coils and thence up through and about the coils and chamber 25, the unevaporated portion of the water circulating back to the chamber 24 and returning to the coils and chamber 25. A substantial portion of the body of water is contained within the chamber 24 and the vaporization takes place more particularly in a section of the chamber within the shell 10 which is less in cubical area than the section 24, and hence the evaporation is rapid and efficient. In addition to the beneficial functional results attained from the arrangement of the bank or banks of coils at one side of the shell 10 and in arcuate outline, the further advantage is secured that the manifolds carrying the coils may be fastened directly to a vertically hinged door 15 and become exposed on the opening of the door, the manifolds and coils being wholly exposed when the door 15 is fully opened. In Fig. 4 the door is shown by dotted lines as in a partly open position. We do not, however, desire to limit our invention so far as the arcuate heating pipe structure is concerned to a hinged door, since the door is as a matter of fact held in closed position by bolts and also since it is common in this art to mount doors carrying coils on rollers so that the door and coils may be pulled outwardly to exposed position. We very greatly prefer the employment of the hinged door, but that portion of our invention having to do with the arcuate and laterally extending heating pipe structure need not necessarily be limited to the hinging of the door, nor to a curved door.

We do not desire to limit our invention to the employment of the apparatus shown as an evaporator only, since this apparatus may also be used for other purposes, as, for illustration, a feed-water heater, in which employment of the apparatus exhaust or other steam may be admitted to the shell 10 and the feed-water passed through the coils 21. Should the apparatus be used as a condenser, the vapor could be passed through the coils 21 and a condensing liquid supplied to the shell 10. We have designed the apparatus more particularly for use as an evaporator.

What we claim as our invention and desire to secure by Letters Patent, is—

1. Apparatus of the character described, comprising a vertical shell having a doorway in its side, a door hinged at one vertical edge to said shell for closing said doorway, upper and lower manifolds secured to the inner surface of said door and exposed at their outer ends to receive pipe connections, and vertical corresponding interchangeable coils connecting said manifolds, said manifolds and the bank of coils being of arcuate outline and extending, when said door is closed, along one side of the chamber within said shell, thereby subdividing said chamber so that a large space is left therein at one side of the said vertical coils and a smaller space is formed at the other side thereof.

2. Apparatus of the character described comprising a vertical shell having a doorway in its side, a door hinged at one vertical edge to said shell for closing said doorway, and a pipe structure secured to and carried by said door and projecting into the chamber of said shell and having inlet and outlet connections through said door, said pipe structure extending, when said door is closed, along one side only of the chamber within the shell, thereby subdividing said chamber so that a large space is left therein at one side of the pipe structure and a smaller space is formed at the other side thereof.

3. Apparatus of the character described comprising a vertical shell having a doorway in its side, a door hinged at one vertical edge to said shell for closing said doorway, and a pipe structure secured to and carried by said door and projecting into the chamber of said shell and having inlet and outlet connections through said door, said pipe structure extending, when said door is closed, along one side of the chamber within the shell and on lines reverse to the curvature of the adjacent portion of said shell, thereby subdividing said chamber so that a large space is left therein at one side of the pipe structure and a smaller space is formed at the other side thereof.

4. Apparatus of the character described, comprising a cylindrical shell having a doorway in its side, a door following the outline of the shell hinged at one edge to said shell for closing said doorway, and a pipe structure secured to and carried by said door and projecting into the chamber of said shell and having inlet and outlet connections through said door, said pipe structure being curved reversely to the curvature of said door and occupying one side portion only of said chamber, thereby subdividing said chamber so that a large space is left therein at one side of the pipe structure and a smaller space is formed at the other side thereof.

5. Apparatus of the character described, comprising a vertical cylindrical shell having a doorway in its side, a door following the outline of the shell for closing said doorway, upper and lower manifolds secured to the inner surface of said door and exposed at their outer ends to receive pipe connections, and vertical corresponding interchangeable coils connecting said manifolds, said manifolds and the bank of coils being of arcuate outline and extending inwardly from the door in a lateral direction and occupying one side portion only of said chamber, thereby subdividing said chamber so that a large space is left therein at one side of the pipe structure and a smaller space is formed at the other side thereof.

6. Apparatus of the character described, comprising a vertical shell having a doorway in its side, a door for closing said doorway, and a pipe structure secured to and carried by said door and projecting into the chamber of said shell and having inlet and outlet connections through said door, said pipe structure extending, when said door is in closed position, along one side only of the chamber within the shell, thereby subdividing said chamber so that a large space is left therein at one side of the pipe structure and a smaller space is formed at the other side thereof.

7. Apparatus of the character described, comprising a vertical shell having a doorway in its side, a door for closing said doorway, and a pipe structure secured to and carried by said door and projecting into the chamber of said shell and having inlet and outlet connections through said door, said pipe structure extending, when said door is closed, along one side only of the chamber within the shell and on lines reverse to the curvature of the adjacent portion of said shell, thereby subdividing said chamber so that a large space is left therein at one side of the pipe structure and a smaller space is formed at the other side thereof.

8. Apparatus of the character described, comprising a vertical shell having a doorway in its side, a door for closing said doorway, and a pipe structure secured to and carried by said door and projecting into the chamber of said shell and having inlet and outlet connections through said door, said pipe structure being curved reversely to the curvature of said door and occupying one side portion only of said chamber, thereby subdividing said chamber so that a large space is left therein at one side of the pipe structure and a smaller space is formed at the other side thereof.

Signed at New York city, in the county of New York and State of New York, this 13th day of March, A. D. 1917.

REUBEN R. ROW.
HOWARD C. DAVIS.

Witnesses:
CHAS. C. GILL,
ARTHUR MARION.